(12) United States Patent
Chen et al.

(10) Patent No.: US 12,131,068 B2
(45) Date of Patent: Oct. 29, 2024

(54) METHOD, ELECTRONIC DEVICE, AND COMPUTER PROGRAM PRODUCT FOR SYNCHRONOUSLY ACCESSING DATA

(71) Applicant: DELL PRODUCTS L.P., Round Rock, TX (US)

(72) Inventors: Tao Chen, Beijing (CN); Ran Liu, Beijing (CN); Wei Lu, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 51 days.

(21) Appl. No.: 17/987,321

(22) Filed: Nov. 15, 2022

(65) Prior Publication Data

US 2024/0103767 A1 Mar. 28, 2024

(30) Foreign Application Priority Data

Sep. 23, 2022 (CN) .......................... 202211164306.1

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
CPC .... G06F 3/0659; G06F 3/0604; G06F 3/0673; G06F 3/061; G06F 3/0625; G06F 3/0634; G06F 3/0647; G06F 3/067

USPC .......................................................... 711/168
See application file for complete search history.

(56) References Cited

U.S. PATENT DOCUMENTS 10,528,255 B2 *  1/2020  Lee ........................ G06F 3/0658
2021/0342230 A1 * 11/2021  Niles ....................... G06F 9/461

* cited by examiner

*Primary Examiner* — Hua J Song
(74) *Attorney, Agent, or Firm* — WOMBLE BOND DICKINSON (US) LLP (57) ABSTRACT

Embodiments of the present disclosure provide a method, an electronic device, and a computer program product for synchronously accessing data. The method may include sending metadata associated with data to be moved by a user to a programmable network device associated with a persistent memory containing the data, so as to enable the programmable network device to move the data based on the metadata, wherein the programmable network device is a smart network interface card having a remote direct memory access function. The method may also include entering a hibernation state. In addition, the method may include exiting from the hibernation state in response to receiving a confirmation of operation completion from the programmable network device, so as to notify the user that an operation of moving the data is complete. By means of the embodiments of the present disclosure, an operation of synchronously accessing data can be implemented, and computing resources of the CPU are saved, thereby improving user experience.

20 Claims, 5 Drawing Sheets

METHOD, ELECTRONIC DEVICE, AND COMPUTER PROGRAM PRODUCT FOR SYNCHRONOUSLY ACCESSING DATA

CROSS-REFERENCE TO RELATED APPLICATION

This patent application claims priority, under 35 U.S.C. § 119, of Chinese Patent Application No. 202211164306.1, filed Sep. 23, 2022, which is incorporated by reference in its entirety.

TECHNICAL FIELD

Embodiments of the present disclosure relate to the field of computers, and more specifically, to a method, an electronic device, and a computer program product for synchronously accessing data.

BACKGROUND

Generally, a persistent memory is used in a direct access (DAX) mode for optimizing performance and programming. However, reading from or writing to a persistent memory in the DAX mode is essentially equivalent to memory copying. Since many storage applications make heavy use of the persistent memory, the CPU overhead of memory copying may become significant. The lack of a synchronous interface brings technical challenges to applying a persistent memory to storage systems in general, and to data protection systems in particular. Therefore, there is a need for a method of synchronously accessing a persistent memory with a small amount of overhead.

SUMMARY OF THE INVENTION

Embodiments of the present disclosure provide a solution for synchronously accessing data.

In a first aspect of the present disclosure, a method for synchronously accessing data is provided. The method may include sending metadata associated with data to be moved by a user to a programmable network device associated with a persistent memory containing the data, so as to enable the programmable network device to move the data based on the metadata, wherein the programmable network device is a smart network interface card having a remote direct memory access function. The method may also include entering a hibernation state. In addition, the method may include exiting from the hibernation state in response to receiving a confirmation of operation completion from the programmable network device, so as to notify the user that an operation of moving the data is complete.

In a second aspect of the present disclosure, an electronic device is provided, including a processor; and a memory coupled to the processor and having instructions stored therein, wherein the instructions, when executed by the processor, cause the electronic device to perform actions including: sending metadata associated with data to be moved by a user to a programmable network device associated with a persistent memory containing the data, so as to enable the programmable network device to move the data based on the metadata, wherein the programmable network device is a smart network interface card having a remote direct memory access function; entering a hibernation state; and exiting from the hibernation state in response to receiving a confirmation of operation completion from the programmable network device, so as to notify the user that an operation of moving the data is complete.

In a third aspect of the present disclosure, a computer program product is provided, wherein the computer program product is tangibly stored on a computer-readable medium and includes machine-executable instructions, wherein the machine-executable instructions, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, the above and other objectives, features, and advantages of the present disclosure will become more apparent, and identical or similar reference numbers generally represent identical or similar components in the example embodiments of the present disclosure. In the accompanying drawings.

DETAILED DESCRIPTION

The principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" indicates "and/or." The term "based on" indicates "based at least in part on." The terms "an example embodiment" and "an embodiment" indicate "a set of embodiments." The term "another embodiment" indicates "a set of additional embodiments." The terms "first," "second," and the like may refer to different or identical objects. Other explicit and implicit definitions may also be included below.

As discussed above, a direct access (DAX) mode is the most recommended way to use a persistent memory. It allows an application to map a persistent memory into its user address space as a series of byte addressable spaces, and access it like a normal DRAM via LOAD/STORE instructions or memcpy/memmove in a C library. The DAX mode can provide the best performance because it provides direct access to a persistent memory from a user space, completely bypassing a page caching mechanism using traditional storage APIs. However, there is currently no synchronous storage mechanism that supports the persistent memory, especially the DAX mode.

In order to at least partially solve the above problem, embodiments of the present disclosure provide a novel solution for synchronously accessing data. Firstly, a computing device may determine, from user instructions, data to be moved and its metadata in a persistent memory. Further, the metadata may be sent to a preset programmable network device which is enabled to move, based on the metadata, the data that a user wants to move. Subsequently, the computing device enters a hibernation mode. It should be understood that the programmable network device is a smart network interface card with a remote direct memory access (RDMA) function. This technology can be used in the present disclosure to achieve synchronous accessing of data. When the data moving is complete, the programmable network device may send, to the computing device, a confirmation of operation completion. Hence, the computing device may exit from the hibernation mode and notify the user that an operation of moving the data is complete. By means of the above operations, synchronous operation of data accessing can be realized, and the CPU can be prevented from performing data movement, reading, and writing, but only allocate such work to the programmable network device, thereby saving computing resources of the CPU.

Figure 1A:
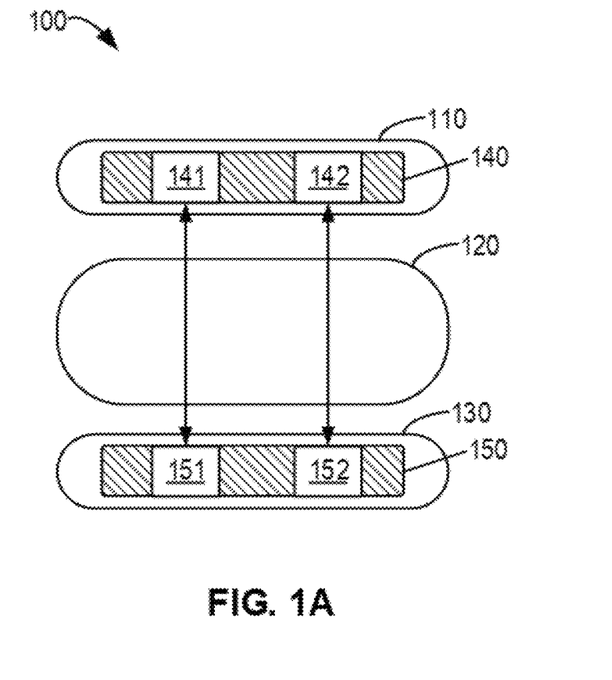
FIG. 1A is a schematic diagram of an example environment according to an embodiment of the present disclosure.

FIG. 1A is a schematic diagram of example environment 100 according to an embodiment of the present disclosure. In example environment 100, a device and/or a process according to an embodiment of the present disclosure may be implemented. As shown in FIG. 1A, example environment 100 may include user space 110, kernel space 120, and hardware 130. It should be understood that user space 110, kernel space 120, and hardware 130 are all associated with a computing device for performing a process of the embodiment of the present disclosure, and most computing resources of the computing device are located in kernel space 120.

In FIG. 1A, user space 110 includes application 140, and hardware 130 includes persistent memory 150. Persistent memory 150 at least includes memory blocks 151 and 152. Correspondingly, application 140 includes user address spaces 141 and 142. It should be understood that a DAS mode of a persistent memory allows application 140 to respectively map memory blocks 151 and 152 in persistent memory 150 to user address spaces 141 and 142 in application 140 as a series of byte addressable spaces. Hence, persistent memory 150 can be accessed via LOAD/STORE instructions or memcpy/memmove in a C library, which is similar to DRAM. As shown in FIG. 1A, the DAS mode of a persistent memory can provide direct access to persistent memory 150 from user space 110, completely bypassing a page caching mechanism using traditional storage APIs, thereby saving computing resources of the CPU.

In some embodiments, the computing device described herein may be any device with a computing capability. As a non-limiting example, the computing device may be any type of fixed computing device or mobile computing device, including but not limited to a desktop computer, a laptop computer, a notebook computer, a tablet computer, and the like.

Figure 1B:
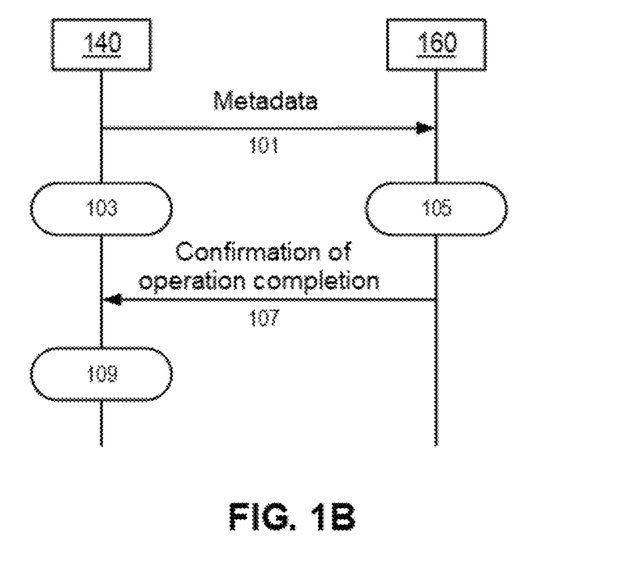
FIG. 1B is a high-level pipeline diagram of an example environment according to an embodiment of the present disclosure.

FIG. 1B is a high-level pipeline diagram of an example environment according to an embodiment of the present disclosure. As shown in FIG. 1B, at 101, application 140 may send metadata of data to be moved by a user to programmable network device 160 with RDMA functions. Subsequently, at 103, application 140 enters a hibernation state. At the same time, at 105, programmable network device 160 performs an operation of data movement. After the data movement operation is complete, at 107, programmable network device 160 returns a confirmation of operation completion to 140, thereby awakening application 140 so as to notify the user at 109.

It should be understood that FIGS. 1A and 1B are merely aimed to illustrate some concepts of the present disclosure, and are not used to limit the scope of the present disclosure.

A process of synchronously accessing data according to an embodiment of the present disclosure will be described in detail below with reference to FIG. 2. For ease of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
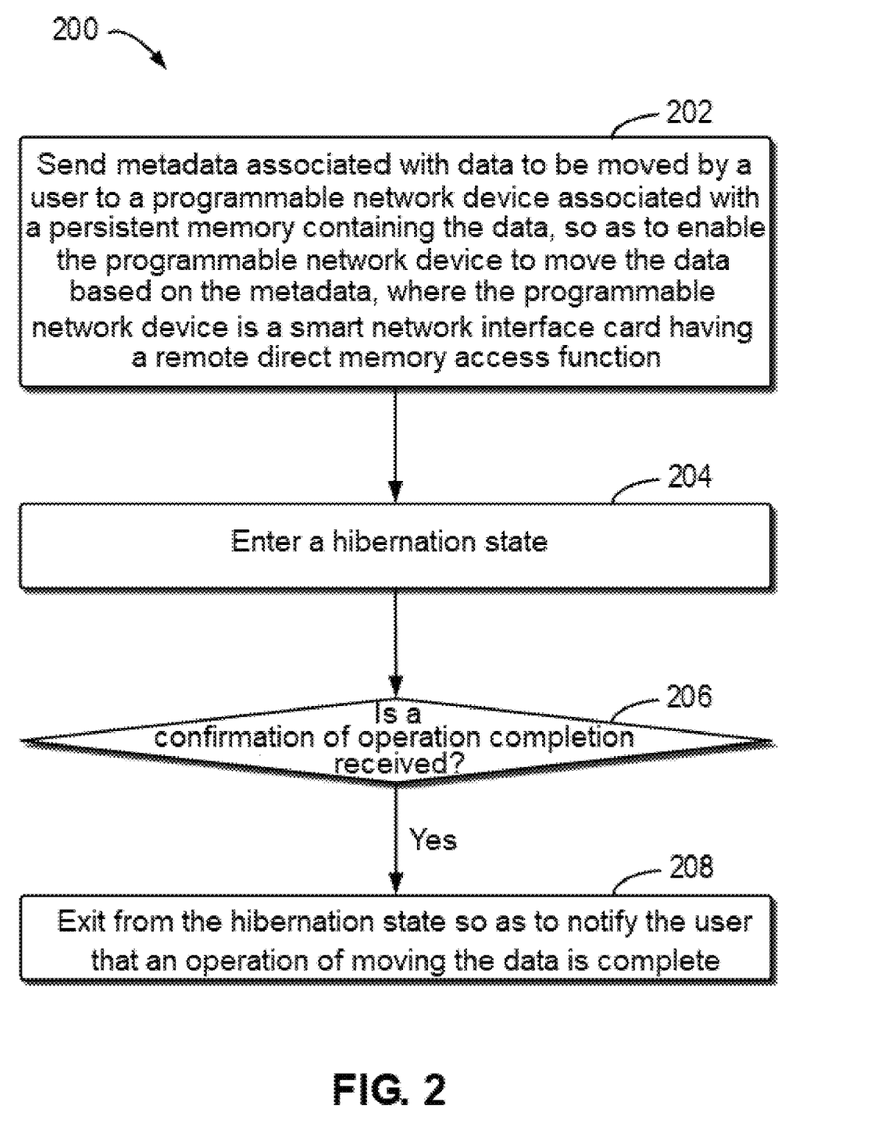
FIG. 2 is a flowchart of a process for synchronously accessing data according to an embodiment of the present disclosure.

FIG. 2 is a flowchart of process 200 for synchronously accessing data according to an embodiment of the present disclosure. Process 200 for data processing according to an embodiment of the present disclosure is described now with reference to FIG. 2. For ease of understanding, specific examples mentioned in the following description are illustrative and are not intended to limit the protection scope of the present disclosure.

As shown in FIG. 2, at 202, a computing device may send metadata associated with data to be moved by a user to a programmable network device associated with a persistent memory containing the data, so as to enable the programmable network device to move the data based on the metadata, where the programmable network device is a smart network interface card having a remote direct memory access function. Before this, the computing device may determine, based on an instruction of the user, the data to be moved and the metadata in the persistent memory. In some embodiments, the metadata at least indicates a source position and a target position of the data to be moved. Alternatively or additionally, the metadata at least indicates a source address, a target address, and a data length of the data to be moved.

In some embodiments, during a process of being moved by the programmable network device, the data is encapsulated as cache data. In some embodiments, the programmable network device is implemented with a smart network interface card. As an example, the programmable network device may be a Host Channel Adapter (HCA) with RDMA functions.

At 204, the computing device enters a hibernation state. It should be understood that since a persistent memory has a relatively fast accessing speed, the time of the hibernation state is short, so it can be considered that data movement is an instant response to a user's request of moving data.

At 206, the computing device may detect in real time whether a confirmation of operation completion from the programmable network device is received, and enters 208 after the confirmation is received. At 208, the computing device may notify the user that an operation of moving the data is complete.

Figure 3:
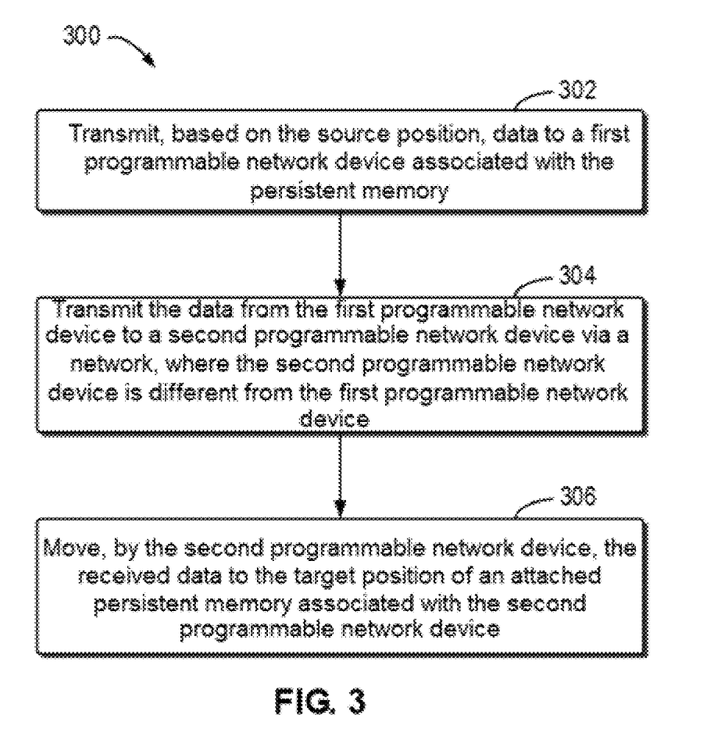
FIG. 3 is a flowchart of a process of moving data by a programmable network device according to an embodiment of the present disclosure.

In order to describe technical solutions of the present disclosure in more detail, FIG. 3 is a flowchart of process 300 of moving data by a programmable network device according to an embodiment of the present disclosure. Process 300 of moving data according to an embodiment of the present disclosure will now be described with reference to FIG. 3. For ease of understanding, specific examples mentioned in the following description are illustrative and are not intended to limit the protection scope of the present disclosure.

As shown in FIG. 3, during a process of moving data by the programmable network device based on metadata, at 302, the data may be transmitted, based on a source position or a source address indicated in the metadata, to a first programmable network device associated with a persistent memory. Subsequently, at 304, the first programmable network device transmits the data to a second programmable network device via a network, where the second programmable network device is different from the first programmable network device. Finally, at 306, the second programmable network device moves the received data to a target position or a target address of an attached persistent memory associated with the second programmable network device. It should be understood that a premise of the above operation is that the source position and the target position indicated in the metadata are respectively located in different persistent memories.

Figure 4:
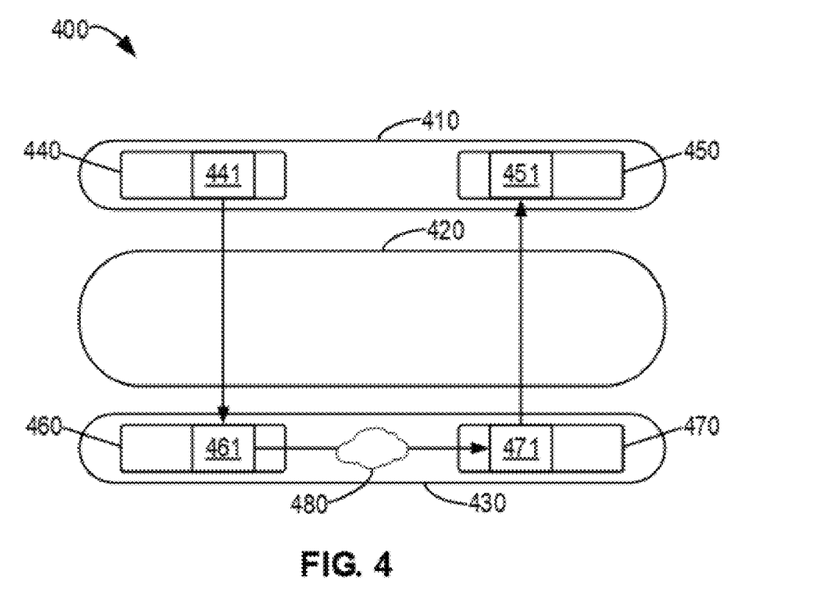
FIG. 4 is a schematic diagram of a scene of moving data by a programmable network device according to an embodiment of the present disclosure.

FIG. 4 is a schematic diagram of another scene 400 of moving data by a programmable network device according to an embodiment of the present disclosure. Scene 400 may include user space 410, kernel space 420, and hardware 430. In FIG. 4, user space 410 includes application 440 and application 450, and hardware 430 includes first programmable network device 460 and second programmable network device 470. It should be understood that both application 440 and application 450 in user space 410 can be mapped to a persistent memory (for example, respectively mapped to different persistent memories). Therefore, operations on applications 440 and 450 in scene 400 may be considered as operations on data in the persistent memory.

First programmable network device 460 may at least include data cache 461, and second programmable network device 470 may at least include data cache 471. Application 440 at least includes user address space 441, and application 450 at least includes user address space 451. As shown in FIG. 4, user address spaces 441 and 451 are respectively used to indicate a source position and a target position of data to be moved by a user, and the source position and the target position are respectively located in different persistent memories. In order to move data, a computing device may distribute metadata associated with the data to first programmable network device 460, so as to enable first programmable network device 460 to acquire, from user address space 441 based on the metadata, data that the user wants to move. Further, first programmable network device 460 may send the acquired data and the metadata of the data to second programmable network device 470 via network 480, and second programmable network device 470 may send, based on the metadata, the received data to user address space 451, thereby achieving an operation of synchronous data accessing.

Specifically, first programmable network device 460 may acquire, based on a source position or a source address indicated in the metadata, data that a user wants to move from user address space 441 in application 440. In some embodiments, the data may be encapsulated in a form of data cache before being transmitted to first programmable network device 460, and the data will be transmitted to a particular position in first programmable network device 460, such as data cache 461. Subsequently, first programmable network device 460 may move the received data to a particular position in second programmable network device 470, such as data cache 471. Further, second programmable network device 470 may move the received data to a target position or a target address, that is, user address space 451 in application 450 in FIG. 4. In this way, a data movement process does not generate overhead in kernel space 420, thereby significantly saving computing resources of the CPU. In addition, since the main work of data transmission is completed by triggering first programmable network device 460 and second programmable network device 470 by the computing device, synchronous accessing of a persistent memory is achieved.

Figure 5:
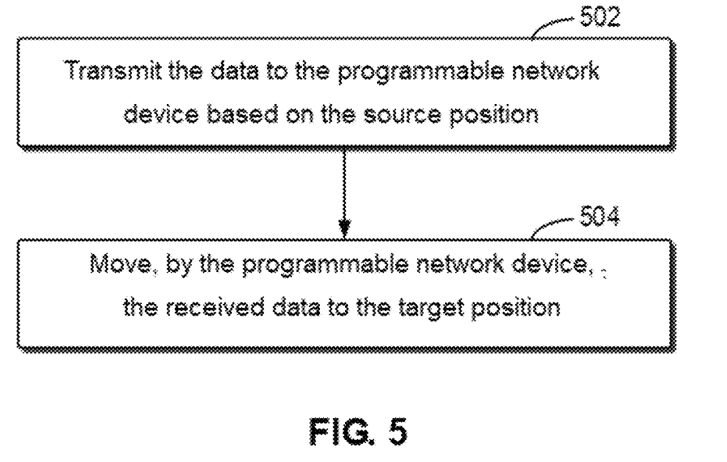
FIG. 5 is a flowchart of another process of moving data by a programmable network device according to an embodiment of the present disclosure.

Alternatively or additionally, in order to describe technical solutions of the present disclosure in more detail, FIG. 5 is a flowchart of process 500 of moving data by a programmable network device according to an embodiment of the present disclosure. Process 500 of moving data according to an embodiment of the present disclosure will now be described with reference to FIG. 5. For ease of understanding, specific examples mentioned in the following description are illustrative and are not intended to limit the protection scope of the present disclosure.

As shown in FIG. 5, during the process of moving data by the programmable network device based on metadata, at 502, the data may be transmitted to the programmable network device based on a source position or a source address indicated in the metadata. Subsequently, at 504, the programmable network device may move the received data to a target position or a target address. It should be understood that a premise of the above operation is that the source position and the target position indicated in the metadata are both located in the same persistent memory.

Figure 6:
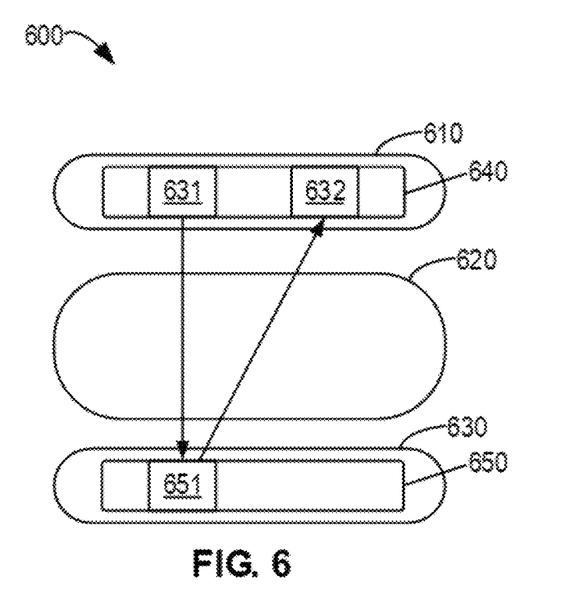
FIG. 6 is a schematic diagram of another scene of moving data by a programmable network device according to an embodiment of the present disclosure.

When the programmable network device is a smart network interface card or HCA with RDMA functions, according to RDMA specifications, an RDMA connection may be established between any two separate interfaces (QPs) of the smart network interface card, and the two interfaces may be located locally on the same HCA. If two separate interfaces on the local HCA are picked up and a connection is established, this connection becomes a loopback connection between the local HCA and itself. This loopback connection may perform data transmission as shown in FIG. 6, which means that data may be transmitted between local persistent memories via the RDMA loopback connection. Details of data transmission are described below in detail with reference to FIG. 6.

FIG. 6 is a schematic diagram of scene 600 of moving data by a programmable network device according to an embodiment of the present disclosure. Scene 600 may include user space 610, kernel space 620, and hardware 630. In FIG. 6, user space 610 includes application 640, and hardware 630 includes programmable network device 650. It should be understood that application 640 in user space 610 may be mapped to a persistent memory. Therefore, an operation on application 640 in scene 600 may be considered as an operation on data in the persistent memory.

Programmable network device 650 at least includes data cache 651. Application 640 at least includes user address spaces 631 and 632. As shown in FIG. 6, user address spaces 631 and 632 are respectively used to indicate a source position and a target position of data to be moved by a user, and the source position and the target position are both located in the same persistent memory. In order to move data, a computing device may distribute metadata associated with the data to programmable network device 650, so as to enable programmable network device 650 to complete an operation of data movement based on the metadata, so as to achieve an operation of synchronous data accessing.

Specifically, programmable network device 650 may acquire, based on a source position or a source address indicated in the metadata, data that a user wants to move from user address space 631 in application 640. In some embodiments, the data may be encapsulated in a form of data cache before being transmitted to programmable network device 650, and the data will be transmitted to a particular position in programmable network device 650, such as data cache 651. Subsequently, programmable network device 650 may move the received data to a target position or a target address, that is, user address space 632 in application 640 in FIG. 6. In this way, a data movement process does not generate overhead in kernel space 620, thereby significantly saving computing resources of the CPU. In addition, since the main work of data transmission is completed by triggering programmable network device 650 by the computing device, synchronous accessing of a persistent memory is achieved.

By means of the above embodiments, a programmable network device with RDMA functions may be used to perform an operation of data accessing, therefore, an original operation of synchronously accessing a persistent memory may be encapsulated as an operation of synchronous accessing. In addition, since a data accessing operation does not occupy a kernel space, computing resources of the CPU are saved.

Figure 7:
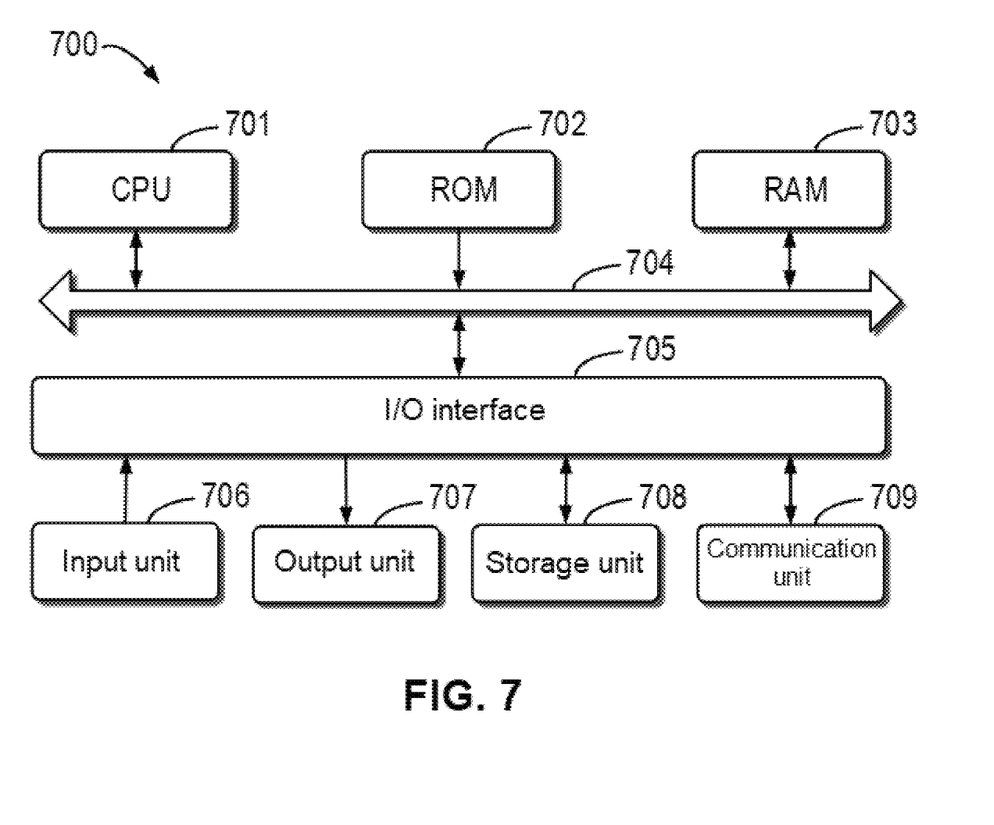
FIG. 7 is a block diagram of an example device that can be used to implement embodiments of the present disclosure.

FIG. 7 is a block diagram of example device 700 that can be used to implement embodiments of the present disclosure. For example, electronic device 700 may be used to implement computing device 221 shown in FIG. 2. As shown in the drawing, electronic device 700 includes central processing unit (CPU) 701 which may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

Processing unit 701 performs the various methods and processing described above, such as processes 300 and 400. For example, in some embodiments, the various methods and processing described above may be implemented as a computer software program or a computer program product, which is tangibly included in a machine-readable medium, such as storage unit 708. In some embodiments, part or all of the computer program may be loaded and/or installed onto device 700 via ROM 702 and/or communication unit 709. When the computer program is loaded into RAM 703 and executed by CPU 701, one or more steps of any process described above may be implemented. Alternatively, in other embodiments, CPU 701 may be configured in any other suitable manners (for example, by means of firmware) to perform a process such as processes 300 and 400.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of those described above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in one programming language or any combination of several programming languages, including an object oriented programming language, such as Smalltalk and C++, and a conventional procedural programming language, such as the "C" language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for synchronously accessing data, comprising:
    sending, to a first programmable network device data to be moved and metadata associated with the data to be moved, the data contained in a first persistent memory associated with the first programmable network device, the metadata indicating a source position and a target position of the data, the first programmable network device comprising a smart network interface card having a remote direct memory access function;
    causing the first programmable network device to transmit the data to a second programmable network device; and
    causing the second programmable network device to move the received data to the target position of a second persistent memory associated with the second programmable network device;
    entering a hibernation state; and
    in response to receiving a confirmation of operation completion from the second programmable network device, exiting from the hibernation state.

2. The method according to claim 1, wherein during a process of being moved by the first programmable network device, the data is encapsulated as cache data.

3. The method according to claim 1, the programmable network device based on the metadata comprises:
    the second programmable network device is different from the first programmable network device, further comprising:
    causing the first programmable network device to transmit the data from the first programmable network device to the second programmable network device via a network.

4. The method according to claim 1, wherein moving the data by the first programmable network device based on the metadata comprises:
    transmitting, based on the source position, the data to the second programmable network device; and
    moving, by the second programmable network device, the received data to the target position.

5. The method according to claim 4, wherein both the source position and the target position are located in the first persistent memory.

6. The method according to claim 1, wherein moving the data by the programmable network device based on the metadata comprises:
    transmitting the data to one of the first programmable network device and the second programmable network device based on the source position; and moving, by the one device, the received data to the target position.

7. The method according to claim 1, wherein the confirmation of operation completion is received in real-time.

8. The method according to claim 1, wherein the source position is located in the first persistent memory and the target position is located in the second persistent memory.

9. An electronic device, comprising:
  a processor; and
  a memory coupled to the processor and having instructions stored therein, wherein the instructions, when executed by the processor, cause the electronic device to:
    send, to a first programmable network device, data to be moved and metadata associated with the data to be moved, the data contained in a first persistent memory associated with the first programmable network device, the metadata indicating a source position and a target position of the data, the first programmable network device comprising a smart network interface card having a remote direct memory access function;
    cause the first programmable network device to transmit the data to a second programmable network device; and
    cause the second programmable network device to move the received data to the target position of a second persistent memory associated with the second programmable network device;
  enter a hibernation state; and
  in response to receiving a confirmation of operation completion from the second programmable network device, exit from the hibernation state.

10. The device according to claim 9, wherein during a process of being moved by the first programmable network device, the data is encapsulated as cache data.

11. The device according to claim 9, wherein the programmable network device based on the metadata comprises:
  the second programmable network device is different from the first programmable network device, further to:
  cause the first programmable network device to transmit the data from the first programmable network device to the second programmable network device via a network.

12. The device according to claim 9, wherein moving the data by the first programmable network device based on the metadata comprises:
  transmitting, based on the source position, the data to the second programmable network device; and
  moving, by the second programmable network device, the received data to the target position.

13. The device according to claim 12, wherein both the source position and the target position are located in the first persistent memory.

14. The device according to claim 9, wherein moving the data by the programmable network device based on the metadata comprises:
  transmitting the data to one of the first programmable network device and the second programmable network device based on the source position; and
  moving, by the one device, the received data to the target position.

15. The device according to claim 9, wherein the confirmation of operation completion is received in real-time.

16. A computer program product that is tangibly stored on a computer-readable medium and comprises machine-executable instructions, wherein the machine-executable instructions, when executed, cause a machine to:
  send, to a programmable network device, data to be moved and metadata associated with the data to be moved, the data contained in a first persistent memory associated with the first programmable network device, the metadata indicating a source position and a target position of the data, the first programmable network device comprising a smart network interface card having a remote direct memory access function;
  cause the first programmable network device to transmit the data to a second programmable network device; and
  cause the second programmable network device to move the received data to the target position of a second persistent memory associated with the second programmable network device;
  enter a hibernation state; and
  in response to receiving a confirmation of operation completion from the programmable network device, exit from the hibernation state.

17. The computer program product according to claim 16, wherein during a process of being moved by the first programmable network device, the data is encapsulated as cache data.

18. The computer program product according to claim 16, wherein:
  the second programmable network device is different from the first programmable network device further to:
  cause the first programmable network device to transmit the data from the first programmable network device to the second programmable network device via a network.

19. The computer program product according to claim 16, wherein moving the data by the first programmable network device based on the metadata comprises:
  transmitting, based on the source position, the data to the second programmable network device; and
  moving, by the second programmable network device, the received data to the target position.

20. The computer program product according to claim 19, wherein both the source position and the target position are located in the first persistent memory.

\* \* \* \* \*

UNITED STATES PATENT AND TRADEMARK OFFICE
CERTIFICATE OF CORRECTION

PATENT NO. : 12,131,068 B2
APPLICATION NO. : 17/987321
DATED : October 29, 2024
INVENTOR(S) : Tao Chen, Ran Liu and Wei Lu

It is certified that error appears in the above-identified patent and that said Letters Patent is hereby corrected as shown below:

In the Claims

In Column 10, Claim 3, Lines 43-44, delete "The method according to claim 1, the programmable network device based on the metadata comprises:" and insert --The method according to claim 1:--.

In Column 11, Claim 11, Lines 37-39, delete "The device according to claim 9, wherein the programmable network device based on the metadata comprises:" and insert --The device according to claim 9, wherein--.

Signed and Sealed this
Tenth Day of June, 2025

Coke Morgan Stewart
*Acting Director of the United States Patent and Trademark Office*